United States Patent
Mindner et al.

(10) Patent No.: US 8,138,900 B2
(45) Date of Patent: Mar. 20, 2012

(54) METHOD AND DEVICE FOR CRASH TYPE IDENTIFICATION FOR A VEHICLE

(75) Inventors: Klaus Mindner, Ludwigsburg (DE); Frank Mack, Seoul (KR); Josef Kolatschek, Weil der Stadt (DE); Gunther Lang, Stuttgart (DE); Joerg Breuninger, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 637 days.

(21) Appl. No.: 11/989,829

(22) PCT Filed: Aug. 2, 2006

(86) PCT No.: PCT/EP2006/064981
§ 371 (c)(1),
(2), (4) Date: Apr. 22, 2009

(87) PCT Pub. No.: WO2007/051661
PCT Pub. Date: May 10, 2007

(65) Prior Publication Data
US 2009/0219149 A1    Sep. 3, 2009

(30) Foreign Application Priority Data
Sep. 6, 2005   (DE) .................... 10 2005 042 198

(51) Int. Cl.
    *G08B 21/00*    (2006.01)
(52) U.S. Cl. .......... 340/436; 701/45; 180/271; 340/438

(58) Field of Classification Search ............. 340/436, 340/438; 701/45, 46, 47; 180/271
See application file for complete search history.

(56) References Cited

U.S. PATENT DOCUMENTS

| | | | |
|---|---|---|---|
| 6,167,335 | A | 12/2000 | Ide et al. |
| 6,198,387 | B1 | 3/2001 | Dalum et al. |
| 2001/0043011 | A1 | 11/2001 | Ugusa et al. |
| 2005/0012312 | A1 | 1/2005 | Roelleke |

FOREIGN PATENT DOCUMENTS

| | | |
|---|---|---|
| DE | 10044918 | 3/2002 |
| DE | 10134331 | 10/2002 |

OTHER PUBLICATIONS

International Search Report, PCT International Patent Application No. PCT/EP2006/064981, dated Nov. 3, 2006.

*Primary Examiner* — Jeffery Hofsass
(74) *Attorney, Agent, or Firm* — Kenyon & Kenyon LLP

(57) ABSTRACT

A method for crash type identification for a vehicle in which sensor data from the left vehicle side and from the right vehicle side are recorded and analyzed via at least two sensor units, as well as an associated device for crash type identification for a vehicle. The sensor data, recorded after an impact, are gated, at least one first gating of the recorded sensor data being checked for fulfillment of a stability criterion and, after meeting the stability criterion, at least one second gating of the recorded sensor data is compared with a predefined threshold value, a first criterion for an asymmetrical impact flag signal being recognized when the second gating of the recorded sensor data exceeds the predefined threshold value and/or falls short of the predefined threshold value.

27 Claims, 2 Drawing Sheets

METHOD AND DEVICE FOR CRASH TYPE IDENTIFICATION FOR A VEHICLE

FIELD OF THE INVENTION

The present invention is directed to a method and device for crash type identification for a vehicle.

BACKGROUND INFORMATION

The restraint systems for passenger protection have been continuously refined since the introduction of airbags. These include, in addition to the front passenger airbag, side impact airbags, and head airbags, also knee airbags and other restraining devices. The evaluation methods used, which make triggering decisions for activating the restraining devices, are generally based on acceleration signals and/or their integrals.

For correct and accurate activation of the restraining devices, the demands on differentiation capability and decision reliability of the data evaluation methods have strongly risen in the past years. In order to meet this rise in demands, acceleration sensors as so-called upfront sensors may be installed in the front section of the vehicle.

A method and a device for triggering passive safety systems are described in the German Patent Application No. DE 101 34 331 C1, for example. The described method makes identification and differentiation of crash severity and crash type possible. In addition, an overlap of an object impacting the vehicle is calculated from the acceleration signals, recorded by sensors, and their simple integrals or from the differences of the simple integrals and the sum of the simple integrals.

A method for protecting passengers of a motor vehicle in the event of an accident is described in German Patent Application No. DE 100 44 918 A1 which analyzes and gates signals from at least two acceleration sensors to ascertain an estimate about the point of impact of an obstacle on the vehicle structure.

SUMMARY

A method according to an example embodiment of the present invention for crash type identification for a vehicle may have the advantage over the related art that, after an impact, for improving the stability and for enhancing the reliability, at least one first gating of sensor data, which are recorded from the left side of the vehicle and from the right side of the vehicle, is checked as to whether at least one predefined stability criterion is met. If the check of the first gating reveals that the at least one stability criterion is met; subsequently at least one second gating of the recorded sensor data is compared with a predefined threshold value. A first criterion for an asymmetrical impact signal is recognized when the second gating of the recorded sensor data exceeds the predefined threshold value and/or falls short of the predefined threshold value. By predefining the stability criterion, the optimum point in time for the analysis of the second gating of the recorded sensor data is determined in an advantageous manner, i.e., the sensor data are not analyzed until the first calculated gating of the sensor data has reached a predefined reliability. The reliability may be controlled via an applicable threshold, for example. For the method according to the present invention, sensor data are recorded during an accident in the proximity of the vehicle front to the left and to the right of a central vehicle longitudinal axis. The sensor data may be recorded symmetrically to the vehicle longitudinal axis, for example.

The method according to the present invention for crash type identification makes it advantageously possible to differentiate frontal accidents having a symmetrical impact pattern from frontal accidents having an asymmetrical impact pattern. Based on this information, activation of the restraining means and thus the passenger protection effect may be better adapted to the crash type and the crash severity. Accidents having a symmetrical impact pattern include, for example, accidents with a 100% barrier overlap or central pole crashes. Asymmetrical accident patterns occur, for example, due to angular crashes and offset crashes with a barrier overlap of less than 100%.

The corresponding device according to an example embodiment of the present invention for crash type identification for a vehicle includes at least one sensor unit situated to the left of the vehicle longitudinal axis in the driving direction, at least one sensor unit situated to the right of the vehicle longitudinal axis in the driving direction, which record sensor data, and an analysis and control unit which analyzes the recorded sensor data. According to an example embodiment of the present invention, the analysis and control unit gates the recorded sensor data after an impact, checks at least one first gating of the recorded sensor data for meeting at least one stability criterion and, after the stability criterion is met, compares at least one second gating of the recorded sensor data with a predefined threshold value. The analysis and control unit recognizes the first criterion for an asymmetrical impact flag signal when the second gating of the recorded sensor data exceeds the predefined threshold value and/or falls short of the predefined threshold value. The two sensor units may be situated, for example, in the front section of the left and right frame side member, on the left and right A, B, or C pillar, or on the left or right door sill.

It may be particularly advantageous if the recorded sensor data are conditioned prior to a gating operation, preferably by a one-time or two-time integration. The recorded sensor data are, for example, acceleration data which may be converted into speed data by a one-time integration or into physical path data by a two-time integration. By appropriately forming sums and/or differences it is possible to calculate acceleration reduction data and/or speed reduction data and/or deformation path data from the recorded acceleration data and/or from the speed data and/or path data obtained from the conditioned acceleration data. In terms of the present invention, the term sensor data includes the recorded and/or the conditioned sensor data.

The sum of the sensor data recorded or conditioned via at least two sensor units is calculated for the first gating, for example. The second gating of the recorded or conditioned sensor data is thus not analyzed until the total value of the recorded or conditioned sensor data exceeds a predefinable threshold value and/or falls short of a predefinable threshold value and has thus reached a predefined reliability.

The difference and/or the absolute value of the difference of the sensor data recorded or conditioned via at least two sensor units is/are calculated for the second gating.

In an example embodiment of the method according to the present invention, the second gating of the recorded or conditioned sensor data is normalized to the first gating of the recorded or conditioned sensor data prior to the comparison with the predefined threshold value. The difference of the recorded or conditioned sensor data is normalized to the total value of the recorded sensor data, for example.

Small differences in value, which occur due to statistical deviations also during accidents with a symmetrical impact pattern, do not have an adverse effect on the analysis result because of the normalization, since deviations are weighted only according to the total value of the recorded sensor data. In addition, the analysis via normalization is advantageously independent from the crash severity, i.e., from the speed at which the accident occurs, since the crash severity at the same offset affects the amplitude of the recorded acceleration signals with approximately the same factor. This also affects the difference in the sensor data recorded by the at least two sensor units. This effect is compensated by the normalization.

In a further example embodiment of the method according to the present invention, a second criterion for the asymmetrical impact flag signal is recognized when, within a predefinable time period, the second gating of the recorded or conditioned sensor data exceeds a second predefined threshold value and/or falls short of a predefined threshold value and a centrally detected speed reduction falls short of a predefined third threshold value and/or exceeds a predefined third threshold value. This advantageously improves the reliability of the crash type identification since accidents with a non-symmetrical impact pattern typically result in a slower increase of the reduced speed signal centrally detected in the vehicle. However, if the speed reduction signal increases quickly then an accident having a symmetrical impact pattern may be deduced with greater probability. In addition, it may be desirable to classify accidents having an asymmetrical impact pattern at a lower accident speed as accidents having a symmetrical impact pattern in order to avoid an unnecessary increase in the sensitivity of the triggering algorithm in these cases. This is true, for example, for accidents having a characteristic which corresponds to a slow crash, e.g., an impact at a speed of 15 km/h. A measure for such accidents is a small value of the non-normalized difference of the recorded acceleration signals which are compared with an adaptable threshold value.

The asymmetrical impact flag signal may be activated, for example, when the first criterion and/or the second criterion is/are met. Otherwise, the asymmetrical impact flag signal is deactivated.

In a further example embodiment of the method according to the present invention, the vehicle side, at which the asymmetrical impact occurred, may be determined after activation of the asymmetrical flag signal in that the sign of the second gating of the recorded or conditioned sensor data is analyzed. Moreover, a correction factor may be calculated and taken into account during the analysis of the recorded sensor data in order to compensate for asymmetrical vehicle structure designs.

To estimate the crash severity it may be checked, for example, whether the asymmetrical impact flag signal is activated within a predefined time period. If the offset recognition takes place in a very short time period, i.e., the activation of the impact flag signal, then a particularly severe crash may be deduced and a special flag signal may be set. If the respective flag signal is recognized by a subsequent analysis process, then the triggering algorithm may be shifted into a more sensitive state via appropriate measures.

In a further embodiment, the method according to the present invention includes a sensor unit centrally located in the vehicle which detects a speed reduction of the vehicle, the analysis and control unit recognizing the second criterion for an asymmetrical impact flag signal when the second gating of the recorded or conditioned sensor data exceeds a second predefined threshold value and/or falls short of a second predefined threshold value within a predefinable time period and the centrally detected speed reduction falls short of a predefined third threshold value and/or exceeds a predefined third threshold value.

The analysis and control unit activates the asymmetrical impact flag signal when the first criterion and/or the second criterion is/are met. Otherwise the analysis and control unit deactivates the asymmetrical flag signal.

BRIEF DESCRIPTION OF THE DRAWINGS

Exemplary embodiments are illustrated in the figures and are explained in greater detail below.

DETAILED DESCRIPTION OF EXAMPLE EMBODIMENTS

Figure 1:
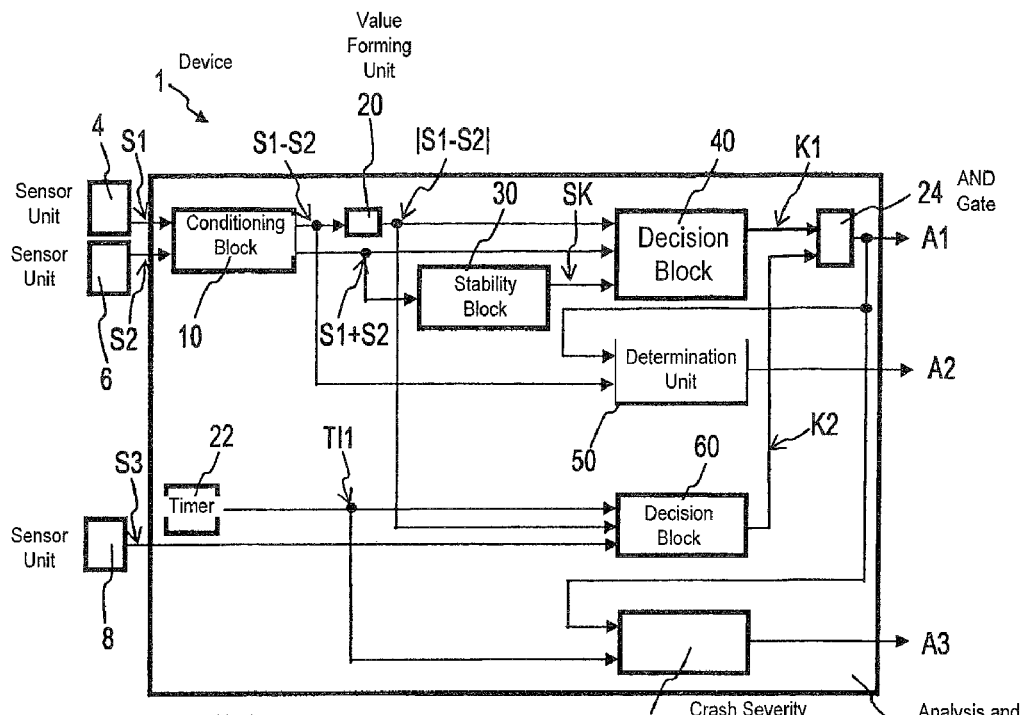
FIG. 1 shows a schematic block diagram of a device for crash type identification for a vehicle.

As is shown in FIG. 1, device 1 for crash type identification for a vehicle includes a sensor unit 4 situated to the left of the vehicle longitudinal axis in the driving direction, a sensor unit 6 situated to the right of the vehicle longitudinal axis in the driving direction, a sensor unit 8 situated centrally in the vehicle, which record sensor data S1, S2, S3, and an analysis and control unit 2 which analyzes the recorded sensor data S1, S2, S3. First and second sensor units 4, 6 are situated, for example, symmetrically to the vehicle longitudinal axis in the front section of the left and right frame side member, on the left and right A, B, or C pillar, or on the left or right door sill of the vehicle.

Figure 2:
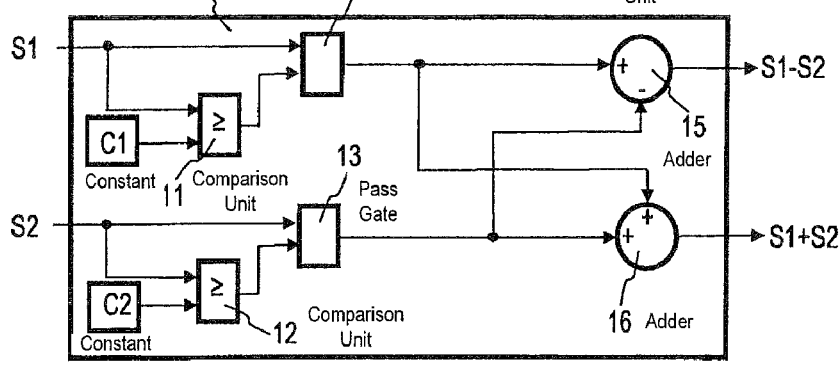
FIG. 2 shows a schematic block diagram of a conditioning block from FIG. 1.

After an impact, analysis and control unit 2 gates in a conditioning block 10 sensor data S1, S2 which are recorded by left-hand sensor unit 4 and right-hand sensor unit 6. Sensor data S1, S2, S3 recorded by sensor units 4, 6, 8 may be conditioned prior to a gating process or an analysis process, preferably via a one-time or two-time integration of sensor data S1, S2, S3. As mentioned above, the recorded sensor data are, for example, acceleration data which may be converted into speed data via a one-time integration and/or into physical path data via a two-time integration. By appropriately forming sums and/or differences it is possible to calculate acceleration reduction data and/or speed reduction data and/or deformation path data from the recorded acceleration data and/or the speed data and/or path data obtained by conditioning the acceleration data. In accordance with the present invention, the term sensor data S1, S2, S3 includes the recorded and/or conditioned sensor data. As is apparent from FIG. 2, conditioning block 10 calculates the sum of sensor data S1, S2 recorded by left and right sensor units 4, 6 for a first gating S1+S2 using a first adder 16 and the difference of recorded or conditioned sensor data S1, S2 for a second gating S1−S2 using a second adder 15. When the second integral of sensor data S1, S2 is used, prior to the gating of recorded or conditioned sensor data S1, S2, and using a constant C1, a comparison unit 11, and a pass gate 14, the value range of the second integral of first sensor data S1 is delimited to values greater than constant C1, constant C1 preferably being set at zero. Using a constant C2, a comparison unit 12, and a pass gate 13, the value range of the second integral of second sensor data S2 is delimited to values greater than constant C2, constant C2 preferably also being set at zero. Absolute value |S1−S2| of second gating S1−S2 of recorded or conditioned sensor data S1, S2 is subsequently calculated by a value forming unit 20.

Figure 3:
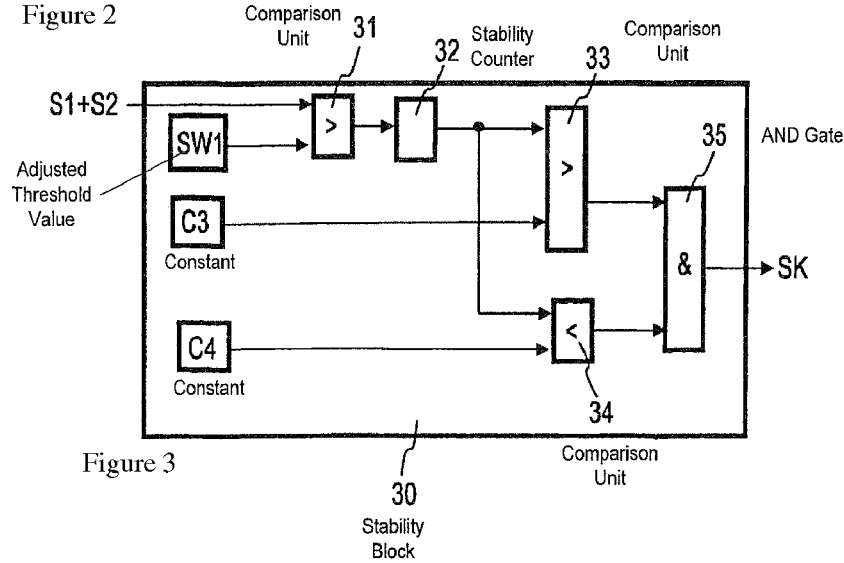
FIG. 3 shows a schematic block diagram of a stability block from FIG. 1.

In a stability block 30, first gating S1+S2 of recorded sensor data S1, S2 is checked for meeting a stability criterion. As is apparent from FIG. 3, a comparison unit 31 compares first gating S1+S2 with an adjustable threshold value SW1 in stability block 30. Using a stability counter 32, two comparison units 33, 34, and an AND gate 35, stability block 30 checks whether threshold value SW1 is exceeded within an adjustable time interval. The time interval is set via constants C3 and C4, constant C3 representing a minimum value and constant C4 representing a maximum value. If the stability criterion is met, i.e., first gating S1+S2 exceeds threshold value SW1 within the time interval between point in time C3 and point in time C4, stability block 30 outputs an activated stability flag signal SK.

Figure 4:
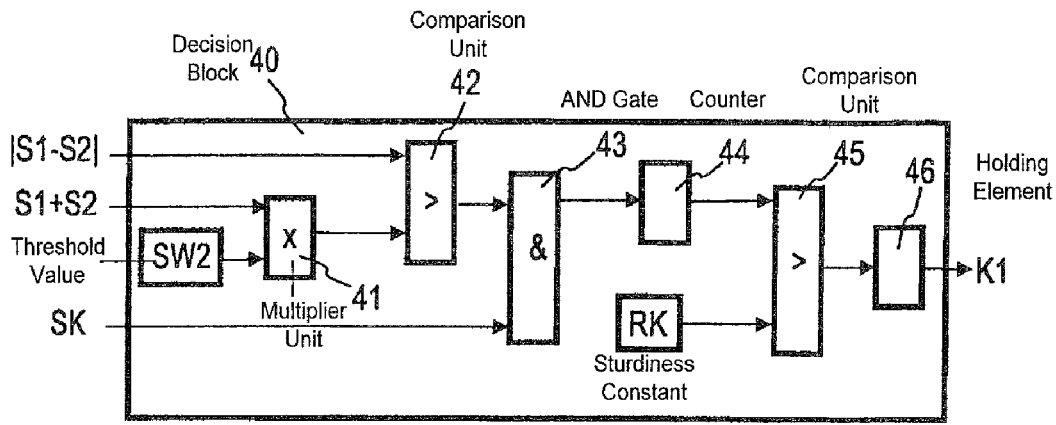
FIG. 4 shows a schematic block diagram of a first decision block from FIG. 1.

A first decision block 40 normalizes absolute value |S1−S2| of second gating S1−S2 to first gating S1+S2, i.e., to the sum of recorded sensor data S1, S2, and compares the normalized absolute value (|S1−S2|)/(S1+S2) with a predefined threshold value SW2 after the stability criterion is met. First decision block 40 analyzes stability signal SK to recognize fulfillment of the stability criterion. This means that the first decision block executes the following comparison (|S1−S2|)/(S1+S2)>SW2, SW2 standing for an adjustable second threshold value. For reasons of easier implementation, as is apparent from FIG. 4, first gating S1+S2 is multiplied by threshold value SW2 by a multiplier unit 41 for this comparison process. A comparison unit 42 subsequently checks whether absolute value |S1−S2| of second gating S1−S2 is greater than the product of second threshold value SW2 and first gating S1+S2. AN AND gate 43 is activated when stability signal SK is set and normalized value (|S1−S2|)/(S1+S2) of second gating S1−S2 is greater than second threshold value SW2. As is shown in FIG. 4, a counter 44, a comparison unit 45, and a sturdiness constant RK are used to check whether AND gate 43 is activated for a predefinable time period which is predefined by sturdiness constant RK. If normalized absolute value (|S1−S2|)/(S1+S2) of second gating S1−S2 is longer than the time period predefined by sturdiness constant RK greater than second threshold value SW2, a holding element 46 is set and a first criterion K1 for an asymmetrical impact flag signal A1 is set and output.

Figure 5:
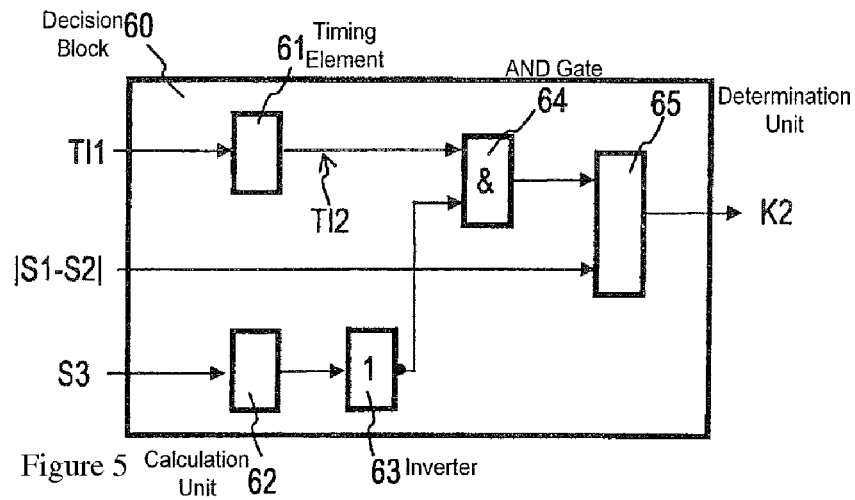
FIG. 5 shows a schematic block diagram of a second decision block from FIG. 1.

A second decision block 60 activates a second criterion K2 for the asymmetrical impact flag signal A1 when absolute value |S1−S2| of second gating S1−S2 of the recorded or conditioned sensor data S1, S2 exceeds an adjustable threshold value within a certain adjustable time period and a speed reduction, calculated from acceleration signal S3 detected by sensor unit 8 centrally situated in the vehicle, falls short of a predefined threshold value. As is shown in FIG. 5, a first time interval TI1, predefined by a timer 22, is varied via an adjustable timing element 61 and an intended time interval TI2 is generated. Acceleration signal S3, detected by sensor unit 8, is converted into a respective speed reduction signal by a calculation unit 62 and an inverter 63. If the speed reduction within the generated time interval TI2 is smaller than a predefined threshold value, then an AND gate 64 is activated and a determination unit 65 ascertains whether absolute value |S1−S2| of second gating S1−S2 additionally exceeds the adjustable threshold value. If the additional condition is also met, then determination unit 65 activates second criterion K2.

Analysis and control unit 2 recognizes an accident having an asymmetrical impact pattern when first criterion K1 and/or second criterion K2 is/are set and activates asymmetrical impact flag signal A1. In the illustrated exemplary embodiment, first criterion K1 is gated with second criterion K2 via an AND gate 24 in such a way that asymmetrical impact flag signal A1 is activated when first and second criteria K1, K2 are met. Otherwise asymmetrical impact flag signal A1 is deactivated. Alternatively, only one of the two criteria may be used by appropriately selecting or predefining the threshold values. In an alternative and not illustrated specific embodiment, both criteria K1, K2 may be gated via an OR gate or an exclusive-OR gate, for example.

In addition, after setting asymmetrical impact flag signal A1, an impact-side determination unit 50, which indicates an accident having an asymmetrical impact pattern, may analyze the sign of second gating S1−S2 of recorded or conditioned sensor data S1, S2 and determines the vehicle side on which the impact occurred. Depending on the ascertained sign, impact-side flag signal A2 may be activated or deactivated.

Figure 6:
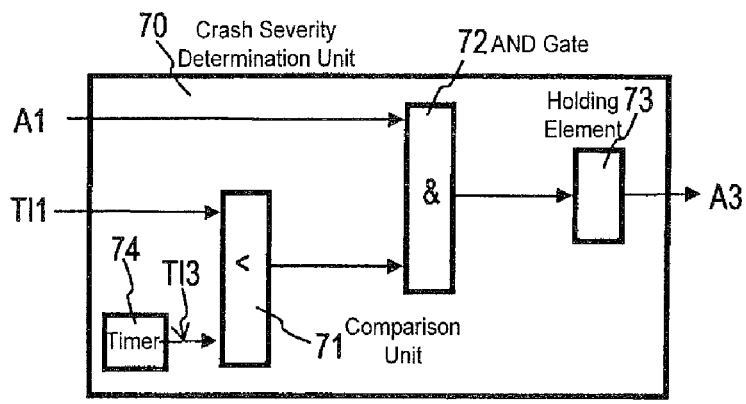
FIG. 6 shows a schematic block diagram of a crash severity block from FIG. 1.

To estimate the crash severity, it may be checked whether asymmetrical impact flag signal A1 is recognized within a predefined time period TI3. As is apparent from FIG. 6, it is determined whether the offset recognition took place within a very short time period TI3 using a timer 74, a comparison unit 71, and an AND gate 72. If this is the case, then AND gate 72 is activated and, via a holding element 73, a flag signal A3 is set which indicates a particular crash severity. If set crash severity signal A3 is recognized by a subsequent triggering process, then a triggering threshold may be shifted into a more sensitive state via appropriate measures, for example.

The described blocks with their different functions each form self-contained units and, in principle, may also be used individually in a different context than offset recognition. For example, the stability time for triggering functions and/or crash determination functions and/or other crash severity determination functions in the area of restraining system activation may also be determined with the aid of the stability block.

The physical path difference, calculated from sensor data recorded during an accident, is advantageously analyzed using the method according to the present invention and the device according to the present invention, i.e., the difference of the second integrals of the detected acceleration signals is analyzed. For example, the sensor data are recorded by two acceleration sensors each situated in the proximity of the vehicle front, to the left and to the right of the central vehicle longitudinal axis, the calculated path difference being normalized with the calculated total path of the two sensor units. Due to the normalization, small path differences, which also occur during accidents having symmetrical impact patterns due to statistical deviations, may not have an adverse effect on the analysis result. Moreover, the analysis result is independent from the crash severity due to the normalization. In addition, for compensating for asymmetrical vehicle structure designs, a correction factor may be calculated and taken into account during the analysis of the recorded sensor data.

Furthermore, the optimum analysis time for the calculated and normalized path difference is determined via the additional stability criterion which is based on the calculated total path of the two sensors. The analysis is only carried out when the calculated and normalized path difference has reached a predefined reliability.

Moreover, the second criterion may be used for recognizing an accident having an asymmetrical impact pattern which, and on the one hand, is made up of the non-normalized path difference of the two sensor units, and on the other hand, however, takes into account the value of the speed reduction up to this point which is determined via an acceleration sensor unit centrally located in the vehicle. The additional second criterion enhances the reliability of crash type identification since accidents having an asymmetrical impact pattern typically cause a slower increase in the reduced speed signal at the location of the central sensor unit. If the speed reduction signal increases quickly, then an accident having a symmetrical impact pattern may be deduced with greater probability than an accident having an asymmetrical impact pattern.

What is claimed is:

1. A method for crash type identification for a vehicle, comprising:
   recording and analyzing sensor data from a left-hand vehicle side and from a right-hand vehicle side via at least two sensor units;
   gating sensor data recorded after an impact, at least one first gating of the recorded sensor data being checked to determine if at least one stability criterion is met;
   after meeting the at least one stability criterion, comparing at least one second gating of the recorded sensor data with a predefined threshold value;
   recognizing a first criterion for an asymmetrical impact flag signal when the second gating of the recorded sensor data exceeds the predefined threshold value or falls short of the predefined threshold value.

2. The method as recited in claim 1, wherein, prior to the gating, the recorded sensor data are conditioned via one of a one-time or two-time integration.

3. The method as recited in claim 1, wherein a sum of the recorded sensor data is calculated for the first gating.

4. The method as recited in claim 1, wherein at least one of a difference and an absolute value of the difference of the recorded sensor data is calculated for the second gating.

5. The method as recited in claim 4, wherein, prior to the comparison with the predefined threshold value, the second gating of the recorded sensor data is normalized to the first gating of the recorded sensor data.

6. The method as recited in claim 1, wherein a second criterion for the asymmetrical impact flag signal is recognized when the second gating of the recorded sensor data one of exceeds a second predefined threshold value or falls short of a second predefined threshold value within a predefinable time period, and a centrally detected speed reduction one of falls short of a predefined third threshold value or exceeds a predefined third threshold value.

7. The method as recited in claim 6, wherein the asymmetrical impact flag signal is set when at least one of the first criterion and the second criterion is met, and the asymmetrical impact flag signal is otherwise deactivated.

8. The method as recited in claim 7, wherein, after setting the asymmetrical impact flag signal for determining an impact side, a sign of the second gating of the recorded sensor data is determined.

9. The method as recited in claim 1, wherein a correction factor is calculated and taken into account during analysis of the recorded sensor data in order to compensate for asymmetrical vehicle structure design.

10. The method as recited in claim 1, further comprising:
    checking whether the asymmetrical impact flag signal is activated within a predefined time period for estimating a crash severity.

11. A device for crash type identification for a vehicle, comprising:
    at least one sensor unit situated to a left of the vehicle longitudinal axis in a driving direction;
    at least one sensor unit situated to a right of the vehicle longitudinal axis in a driving direction, the at least one sensor unit situated to the left and the at least one sensor unit situated to the right adapted to record sensor data; and
    an analysis and control unit adapted to analyze the recorded sensor data, the analysis and control unit further adapted to gate the recorded sensor data after an impact, checks at least one first gating of the recorded sensor data for fulfillment of a stability criterion, and, after the stability criterion is met, compare at least one second gating of the recorded sensor data with a predefined threshold value, the analysis and control unit adapted to recognize a first criterion for an asymmetrical impact flag signal when the second gating of the recorded sensor data one of exceeds the predefined threshold value or falls short of the predefined threshold value.

12. The device as recited in claim 11, further comprising:
    a sensor unit centrally situated in the vehicle adapted to detect a speed reduction of the vehicle;
    wherein the analysis and control unit is adapted to recognize a second criterion for an asymmetrical impact flag signal when the second gating of the recorded sensor data one of exceeds a second predefined threshold value or falls short of a second predefined threshold value within a predefinable time period, and the centrally detected speed reduction one of falls short of a predefined third threshold value or exceeds a predefined third threshold value.

13. The device as recited in claim 12, wherein the analysis and control unit is adapted to set the asymmetrical impact flag signal when at least one of the first criterion and the second criterion is met, and otherwise deactivates the asymmetrical impact flag signal.

14. The device as recited in claim 11, wherein, prior to the gating, the recorded sensor data are conditioned via one of a one-time or two-time integration.

15. The device as recited in claim 11, wherein a sum of the recorded sensor data is calculated for the first gating.

16. The device as recited in claim 1, wherein at least one of a difference and an absolute value of the difference of the recorded sensor data is calculated for the second gating.

17. The device as recited in claim 16, wherein, prior to the comparison with the predefined threshold value, the second gating of the recorded sensor data is normalized to the first gating of the recorded sensor data.

18. The device as recited in claim 11, wherein a second criterion for the asymmetrical impact flag signal is recognized when the second gating of the recorded sensor data one of exceeds a second predefined threshold value or falls short of a second predefined threshold value within a predefinable time period, and a centrally detected speed reduction one of falls short of a predefined third threshold value or exceeds a predefined third threshold value.

19. The device as recited in claim 18, wherein the asymmetrical impact flag signal is set when at least one of the first criterion and the second criterion is met, and the asymmetrical impact flag signal is otherwise deactivated.

20. The device as recited in claim 19, wherein, after setting the asymmetrical impact flag signal for determining an impact side, a sign of the second gating of the recorded sensor data is determined.

21. The device as recited in claim 11, wherein a correction factor is calculated and taken into account during analysis of the recorded sensor data in order to compensate for asymmetrical vehicle structure design.

22. The device as recited in claim 11, further comprising:
checking whether the asymmetrical impact flag signal is activated within a predefined time period for estimating a crash severity.

23. The method as recited in claim 1, wherein, prior to the gating, the recorded sensor data are conditioned via one of a one-time or two-time integration, wherein a sum of the recorded sensor data is calculated for the first gating, and wherein at least one of a difference and an absolute value of the difference of the recorded sensor data is calculated for the second gating.

24. The method as recited in claim 23, wherein, prior to the comparison with the predefined threshold value, the second gating of the recorded sensor data is normalized to the first gating of the recorded sensor data.

25. The method as recited in claim 23, wherein a second criterion for the asymmetrical impact flag signal is recognized when the second gating of the recorded sensor data one of exceeds a second predefined threshold value or falls short of a second predefined threshold value within a predefinable time period, and a centrally detected speed reduction one of falls short of a predefined third threshold value or exceeds a predefined third threshold value.

26. The method as recited in claim 25, wherein the asymmetrical impact flag signal is set when at least one of the first criterion and the second criterion is met, and the asymmetrical impact flag signal is otherwise deactivated, and wherein, after setting the asymmetrical impact flag signal for determining an impact side, a sign of the second gating of the recorded sensor data is determined.

27. The method as recited in claim 1, further comprising:
checking whether the asymmetrical impact flag signal is activated within a predefined time period for estimating a crash severity;
wherein a correction factor is calculated and taken into account during analysis of the recorded sensor data in order to compensate for asymmetrical vehicle structure design.

* * * * *